(12) United States Patent
Kosche et al.

(10) Patent No.: US 6,986,126 B2
(45) Date of Patent: *Jan. 10, 2006

(54) METHOD AND APPARATUS FOR DETECTING VIOLATIONS OF TYPE RULES IN A COMPUTER PROGRAM

(75) Inventors: Nicolai Kosche, San Francisco, CA (US); Douglas E. Walls, Belmont, CA (US); David D. Pagan, Redding, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 655 days.

This patent is subject to a terminal disclaimer.

(21) Appl. No.: 09/834,770

(22) Filed: Apr. 13, 2001

(65) Prior Publication Data

US 2004/0015902 A1    Jan. 22, 2004

(51) Int. Cl.
*G06F 9/44*      (2006.01)

(52) U.S. Cl. .................. 717/126; 717/128; 717/140; 716/47

(58) Field of Classification Search ............... 717/151, 717/116, 131, 124–129, 140–143; 715/513; 706/47

See application file for complete search history.

(56) References Cited

U.S. PATENT DOCUMENTS

| | | | | |
|---|---|---|---|---|
| 5,293,629 A | * | 3/1994 | Conley et al. .............. | 717/154 |
| 5,583,988 A | | 12/1996 | Crank et al. ........... | 395/185.01 |
| 5,740,440 A | * | 4/1998 | West .................... | 717/125 |
| 5,875,334 A | * | 2/1999 | Chow et al. ............... | 717/141 |
| 5,937,187 A | * | 8/1999 | Kosche et al. .............. | 718/104 |
| 6,029,144 A | * | 2/2000 | Barrett et al. ................. | 705/30 |
| 6,149,318 A | * | 11/2000 | Chase et al. ................. | 717/131 |
| 6,314,439 B1 | * | 11/2001 | Bates et al. ................. | 715/513 |
| 6,341,366 B1 | * | 1/2002 | Wang et al. ................... | 716/11 |
| 6,353,925 B1 | * | 3/2002 | Stata et al. ................. | 717/112 |
| 6,427,235 B1 | * | 7/2002 | Kosche et al. .............. | 717/148 |
| 6,463,470 B1 | * | 10/2002 | Mohaban et al. ........... | 709/223 |
| 6,631,518 B1 | * | 10/2003 | Bortnikov et al. .......... | 717/158 |

(Continued)

OTHER PUBLICATIONS

Bacon et al., "Fast static analysis of C++ virtual function calls", ACM SIGPLAN Notices, Proceedings of the 11th ACM SIGPLAN conference on Object-oriented programming, systems, languages, and applications, vol. 31 Issue 10, Oct. 1996.*

(Continued)

*Primary Examiner*—Anil Khatri
(74) *Attorney, Agent, or Firm*—Park, Vaughan & Fleming LLP

(57) ABSTRACT

One embodiment of the present invention provides a system that detects violations of type rules in a computer program. The system operates by locating a type casting operation within the computer program, wherein the type casting operation involves a first pointer and a second pointer. The system then checks the type casting operation for a violation of a type rule. If a violation is detected, the system indicates the violation. In one embodiment of the present invention, if the first pointer is defined to be a structure pointer and the second pointer is not defined to be a structure pointer, the system indicates a violation of a type rule. In one embodiment of the present invention, if the first pointer is defined to point to a first structure type and the second pointer is defined to point to a second structure type, the system determines whether the first structure type and the second structure type belong to the same alias group. If not, the system generates an error to indicate a type violation.

27 Claims, 3 Drawing Sheets

U.S. PATENT DOCUMENTS 6,651,244 B1 * 11/2003 Smith et al. .................. 717/154
6,658,398 B1 * 12/2003 Bertrand et al. .............. 706/47
6,718,542 B1 *  4/2004 Kosche et al. ............... 717/151
6,745,383 B1 *  6/2004 Agarwal et al. ............. 717/132

OTHER PUBLICATIONS

Diwan et al., "Type-based alias analysis", ACM SIGPLAN Notices, Proceedings of the ACM SIGPLAN 1998 conference on Programming language design and implementation, vol. 33 Issue 5, May 1998.*

Altucher et al., "An extended form of must alias analysis for dynamic allocation", Proceedings of the 22nd ACM SIGPLAN-SIGACT symposium on Principles of programming languages, Jan. 1995.*

Flanagan et al, "Type based race detection for Java", ACM PLDI, pp 219-232, 2000.*

Austin et al., "Efficient detection of all pointer and array access errors", ACM SIGPLAN, pp 290-301, Jun. 1994.*

Necula et al., "CCured: Type safe retrofitting of leagacy code", ACM POPL, pp 128-139, Jan. 2002.*

Siff et al, "Coping with type casts in C", ACM SIGSOFT, International Symp. of Foundation of SW Engineering, vol. 24, issue, 6, pp 180-198, 1999.*

"C User's Guide Supplement for the Forte Developer 6 update 1 (Sun WorkShop 6 update 1)", Sun Microsystems, Inc., Part No. 806-6145-10, Oct. 2000, Revision A, XP-002242198.

* cited by examiner

METHOD AND APPARATUS FOR DETECTING VIOLATIONS OF TYPE RULES IN A COMPUTER PROGRAM

BACKGROUND

1. Related Application

The subject matter of this application is related to the subject matter in a co-pending non-provisional application by inventors Nicolai Kosche, Milton E. Barber, Peter C. Damron, Douglas Walls and Sidney J. Hummert filed on Apr. 15, 2000 entitled, "Disambiguating Memory References Based Upon User-Specified Programming Constraints," having Ser. No. 09/549,806. This related application is hereby incorporated by reference in order to support the instant application.

2. Field of the Invention

The present invention relates to the process of developing and debugging software for computer systems. More specifically, the present invention relates to a method and an apparatus for detecting violations of type rules in a computer program.

3. Related Art

Compilers perform many optimizations during the process of translating computer programs from human-readable source code form into machine-readable executable code form. Some of these optimizations improve the performance of a computer program by reorganizing instructions within the computer program so that the instructions execute more efficiently. For example, it is often advantageous to initiate a read operation in advance of where the data returned by the read operation is used in the program so that other instructions can be executed while the read operation is taking place.

Unfortunately, the problem of "aliasing" greatly restricts the freedom of a compiler to reorganize instructions to improve the performance of a computer program. The problem of aliasing arises when two memory references can potentially access the same location in memory. If this is the case, one of the memory references must be completed before the other memory reference takes place in order to ensure that the program executes correctly. For example, an instruction that writes a new value into a memory location cannot be moved so that it occurs before a preceding instruction that reads from the memory location without changing the value that is read from the memory location.

The problem of aliasing is particularly acute for programs that make extensive use of memory references through pointers, because pointers can be easily modified during program execution to point to other memory locations. Hence, an optimizer must typically assume that a pointer can reference any memory location. This assumption greatly limits the performance improvements that can the achieved by a code optimizer.

One solution to this problem is to use a strongly typed computer programming language, such as Pascal, that restricts the way in which pointers can be manipulated. For example, in a strongly typed language, a pointer to a floating point number cannot be modified to point to an integer. Hence, an optimizer is able to assume that pointers to floating pointer numbers cannot be modified to point to integers, and vice versa. The drawback of using strongly typed languages is that strong type restrictions can greatly reduce the freedom of the programmer.

An alternative solution is to construct a code optimizer that detects all of the aliasing conditions that can arise during program execution. Unfortunately, the task of detecting all of the aliasing conditions that can potentially arise is computationally intractable and/or undecidable for all but the most trivial computer programs.

Another solution is to use programming standards. The C programming language standard imposes type-based restrictions on the way pointers may be used in standard-conforming programs. Unfortunately, these programming standards are flagrantly ignored in programs of enormous economic importance, such as major database applications. Consequently, compilers do not use the restrictions imposed by programming standards to achieve better performance.

The process of determining whether two memory references alias is known as alias "disambiguation." Note that alias disambiguation is typically performed through interprocedural pointer analysis, which is intractable in both space and time for large commercial applications.

What is needed is a method and an apparatus that makes validation of type-based restrictions tractable for large commercial applications.

SUMMARY

One embodiment of the present invention provides a system that detects violations of type rules in a computer program. The system operates by locating a type casting operation within the computer program, wherein the type casting operation involves a first pointer and a second pointer. The system then checks the type casting operation for a violation of a type rule. If a violation is detected, the system indicates the violation.

In one embodiment of the present invention, if the first pointer is defined to be a structure pointer and the second pointer is not defined to be a structure pointer, the system indicates a violation of a type rule.

In one embodiment of the present invention, if the first pointer is a structure pointer and the second pointer is a void or char pointer, the system indicates the violation of the type rule by generating a warning to warn a programmer of a potential type violation. On the other hand, if the second pointer is a pointer to a scalar, the system generates an error to indicate a type violation to the programmer.

In one embodiment of the present invention, if the first pointer is defined to point to a first structure type and the second pointer is defined to point to a second structure type, the system determines whether the first structure type and the second structure type belong to the same alias group. If not, the system generates an error to indicate a type violation. In a variation on this embodiment, if the system is operating at a strict alias level or higher, and the first and second pointers are not explicitly aliased, the system generates an error to indicate a type violation.

In a variation in this embodiment, the system determines whether the first structure type and the second structure type belong to the same alias group by keeping track of special program statements that link structure types into alias groups. The system then determines that the first structure type and the second structure type belong to the same alias group if the first structure type and the second structure type are the same structure type, or if one or more special procedures (such as program instructions or compilation command line options) link the first structure type and the second structure type into the same alias group. In a variation in this variation, the system additionally determines that the first structure type and the second structure type belong to the same alias group if the first structure type and the second structure type have all the same basic types in the same order.

In one embodiment of the present invention, the computer program is received in source code form, and the system parses the computer program into an intermediate form prior to locating the type casting operation.

In one embodiment of the present invention, the system is configured to receive an identifier for a set of constraints on memory references that a programmer has adhered to in writing the computer program. The system uses the identifier to select a type casting rule from a set of type casting rules, wherein the selected type casting rule is associated with the set of constraints, and wherein each type casting rule is associated with a different set of constraints on memory references.

In one embodiment of the present invention, the system is part of a compiler.

In one embodiment of the present invention, the system is part of an error checking application, which is not part of a compiler.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
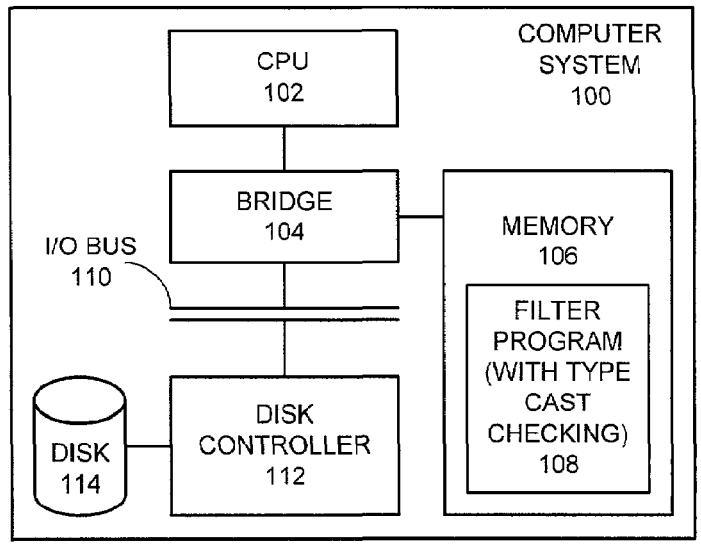
FIG. 1 illustrates a computer system in accordance with an embodiment of the present invention.

FIG. 1 illustrates a computer system 100 in accordance with an embodiment of the present invention. Computer system 100 includes central processing unit (CPU) 102, bridge 104, memory 106, disk controller 112 and disk 114. CPU 102 can include any type of computational circuitry, including, but not limited to, a microprocessor, a mainframe computer, a digital signal processor, a personal organizer, a device controller and a computational device within an appliance.

CPU 102 is coupled to memory 106 through bridge 104. Bridge 104 can include any type of circuitry for coupling CPU 102 with other components in computer system 100. Memory 106 can include any type of random access memory that can be used to store code and data for CPU 102.

CPU 102 is coupled to disk 114 through disk controller 112, bridge 104 and I/O bus 110. I/O bus 110 can include any type of communication channel for coupling I/O devices with computer system 100. Disk controller 112 can include any type of circuitry for controlling the actions of storage devices, such as disk 114. Disk 114 can include any type of non-volatile storage for computer system 100. This includes, but is not limited to, magnetic storage, flash memory, ROM, EPROM, EEPROM, and battery-backed-up RAM.

Memory 106 contains a filter program 108, such as the "lint(1)" UNIX operating system utility, that has been augmented to check type cast operations in accordance with an embodiment of the present invention. Note that filter program 108 is generally used to detect bugs and irregularities in a program.

Also note that the present invention can generally be used within any type of computing system, and is not limited to the computing system illustrated in FIG. 1.

Filter Program

Figure 2:
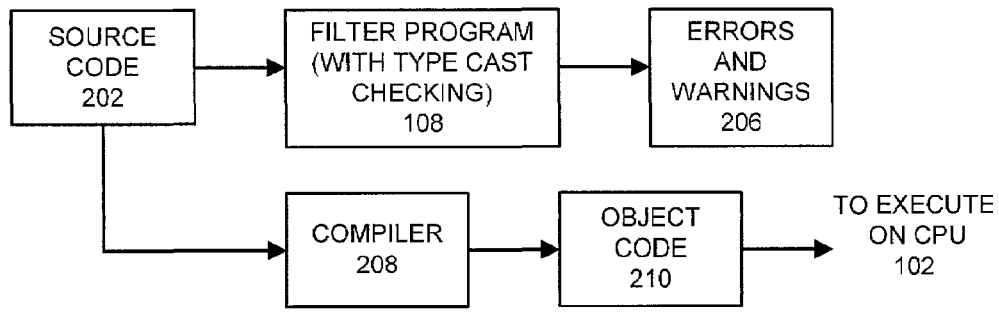
FIG. 2 illustrates how a filter program is used in accordance with an embodiment of the present invention.

FIG. 2 illustrates how a filter program 108 is used in accordance with an embodiment of the present invention. Filter program 108 analyzes source code 202 to produce warnings and/or errors 206, which indicate potential bugs and irregularities in source code 202. This allows a programmer to correct the potential bugs and irregularities. After these corrections are made, the programmer processes source code through compiler 208, which converts source code 202 into machine-readable object code 210 for execution on CPU 102. Note that filter program 108 has been augmented to additionally validate type casting operations, to ensure that type casting operations within source code 202 conform to one or more rules specifying legal type casting operations.

In another embodiment of the present invention, the functions of filter program 108 are embedded within compiler 208, instead of residing in a separate filter program 108.

Figure 3:
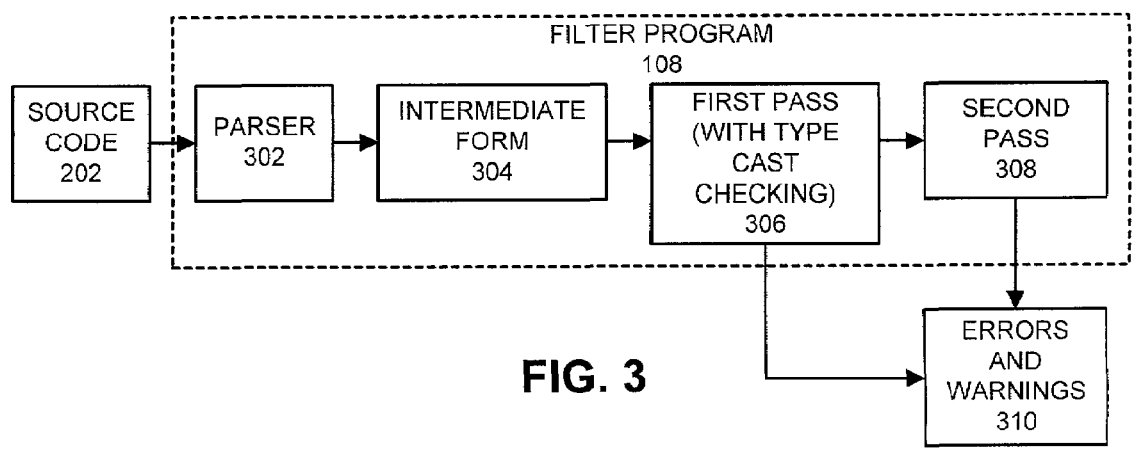
FIG. 3 illustrates the internal structure of a filter program in accordance with an embodiment of the present invention.

FIG. 3 illustrates the internal structure of filter program 108 in accordance with an embodiment of the present invention. Source code 202 is first processed through a parser 302 to produce intermediate form 304. This intermediate form 304 is processed through a first pass 306. First pass 306 generally checks assignment operations, arguments and expressions as in a normal lint program. First pass 306 has been additionally augmented to check type casting operations against a set of rules for type casting operation in accordance with an embodiment of the present invention. The output of first pass 306 is processed through a second pass 308, which performs global analysis on the program.

Note that first pass 306 and second pass 308 can generate errors and warnings 310 if any potential bugs and irregularities are detected. This allows the programmer to make corrections to source code 202.

Selection of Type Casting Rules

Figure 4:
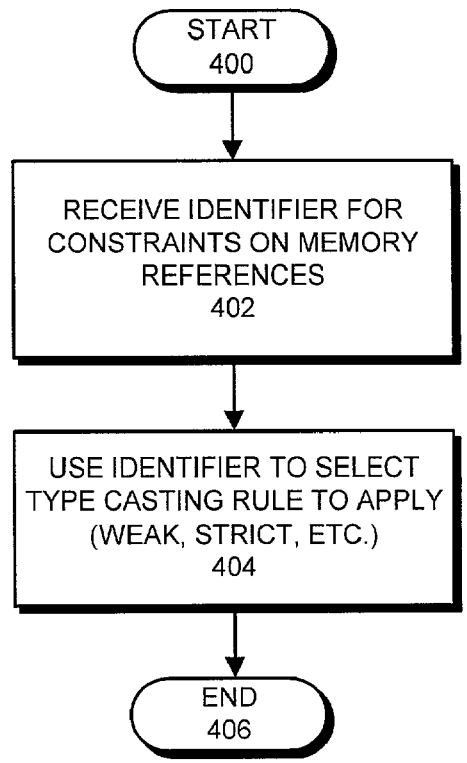
FIG. 4 illustrates how constraints are used to select a type casting rule in accordance with an embodiment of the present invention.

FIG. 4 illustrates how constraints are used to select a type casting rule in accordance with an embodiment of the present invention. The system first receives an identifier for a set of constraints on memory references that the programmer has adhered to (step 402). This identifier can be received as a command line argument during the compilation process, or can be received through explicit commands (or pragmas) within the code.

This identifier is used to select a type casting rule (or set of type casting rules) to apply (step 404), and this type casting rule is subsequently used to detect problematic type casting operations.

Locating Aliasing Statements

Figure 5:
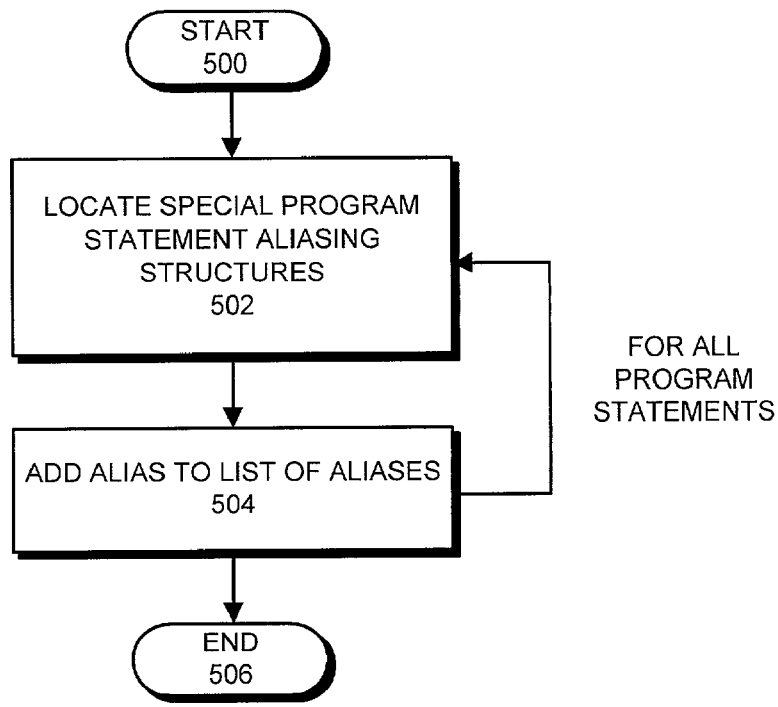
FIG. 5 illustrates how special aliasing statements are identified and processed in accordance with an embodiment of the present invention.

FIG. 5 illustrates how special aliasing statements are identified and processed in accordance with an embodiment of the present invention. The system first locates a special program statement that expressly aliases two structures (step 502). For example, the statement, "#pragma alias(struct foo, struct bar)" indicates that the structure "foo" should alias with the structure "bar." Next, the system adds the located alias to a linked list containing pragmas that apply to structures (step 504). This enables type casting operations to be checked against the aliases in the linked list.

Note that the process illustrated in FIG. 5 takes place during first pass 306, at the same time that the type cast operations are being validated. Hence, the linked list will only contain aliases that have been encountered so far during the first pass. Therefore, subsequent aliases will not apply to preceding type casting operations. It is consequently advantageous to define aliases in a global header file to ensure that they apply to all type cast statements in the code.

Validating Type Casting Operations

Figure 6:
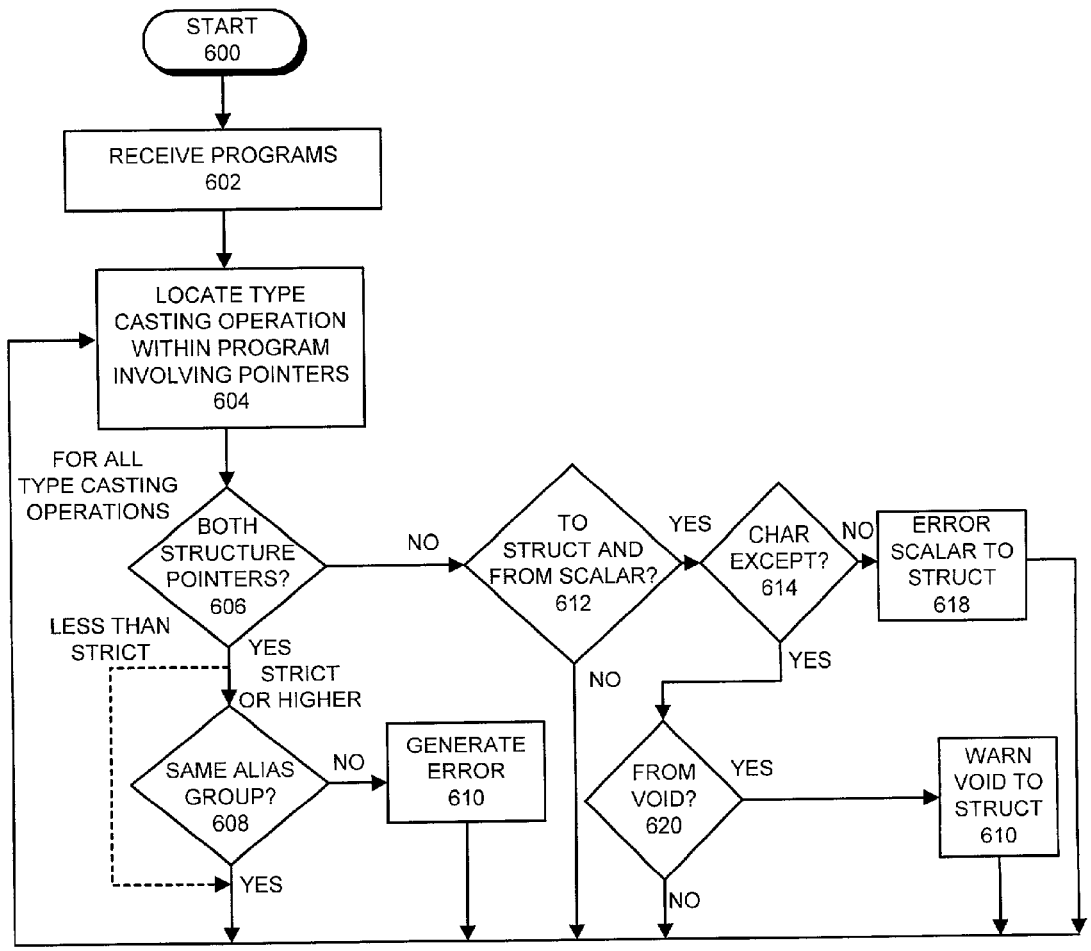
FIG. 6 is a flow chart illustrating the process of validating type casting operations in accordance with an embodiment of the present invention.

FIG. 6 is a flow chart illustrating the process of validating type casting operations in accordance with an embodiment of the present invention. Note that this flow chart covers type cast checking for both the "weak" and the "strict" cases that are described in more detail in a related patent application by inventors Nicolai Kosche, Milton F. Barber, Peter C. Damron, Douglas Walls and Sidney J. Hummert filed on Apr. 15, 2000 entitled, "Disambiguating Memory References Based Upon User-Specified Programming Constraints," having Ser. No. 09/549,806. This related application is hereby incorporated by reference in order to provide additional details of the "weak" and "strict" cases.

The system first receives the program in parsed form (step 602). Next, the system locates type casting operations within the program that involve pointers (step 604). Note that these type casting operations can occur at a number of locations, such as within assignment operations, within function calls and within expressions. For example, if there are two structures "foo" and "bar" defined, with associated pointers "fp" and "bp," a cast can be made between pointers and the structures as follows.

```
struct foo {
    int f1;
    int f2;
} *fp;
struct bar {
    int b1;
    short b2;
    short b3;
} *bp;
fp = (struct foo*) bp;
```

Next, the system determines if both pointers, fp and bp, involved in the type casting operation are structure pointers (step 606). If so, and if the type casting rule is associated a rule that is less than strict, both pointers are assumed to alias, and the system returns to step 604 (through the dashed line) to validate the next type casting operation.

If both pointers involved in the type casting operation are structure pointers, and if the type casting rule is associated with the strict type rule or higher, the system determines whether they belong to the same alias group (step 608). If not, the system generates an error (step 610) and returns to step 604. Note that under a strict alias level, a cast of a struct pointer to a struct pointer requires explicit aliasing.

Otherwise, if they belong to the same alias group, the system takes no action and returns to step 604 to validate the next type casting operation. Note that the two pointers belong to the same alias group if, (1) both pointers point to the same type of structure, (2) both structure types have all the same basic types in the same order, or (3) if one or more special program instructions link both structure types into the same alias group. Note that this is not the only way an alias group can be defined. In general, many other definitions of alias groups can be used.

If both pointers involved in the type casting operation are not structure pointers, the system determines if the "to" pointer is a struct pointer and the "from" pointer is a scalar pointer (step 612). If not, the system returns to step 604 to validate the next type casting operation.

Otherwise, the system determines if there is a char exception (step 614). If not, the system generates an error to alert the programmer that there could be a cast of a scalar pointer to a struct pointer (step 618) before returning to step 604 to process the next type casting operation.

If there is a char exception, the system determines if the from pointer is a void pointer (step 620). If not, the system next returns to step 604 to process the next type casting operation. If so, the system generates a warning indicating that there is a cast of a void pointer to a struct pointer (step 610) before returning to step 604 to process the next type casting operation. Otherwise, the system returns to step 604 directly.

Note that casting is not in general a transitive operation. For example, casting from any structure to a void is typically allowed, whereas casting from a void to other structures may create problems. Hence, type checking may have to be performed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting violations of type casting rules in a computer program, comprising:
   receiving the computer program prior to compilation and execution, wherein the computer program is received in source code form;
   locating an explicit-type casting operation within the computer program, wherein the explicit type casting operation involves a first pointer and a second pointer;
   checking the explicit type casting operation for a violation of a type casting rule; and
   if a violation is detected, indicating the type-casting violation.

2. The method of claim 1, wherein checking the explicit type casting operation involves determining if the first pointer is defined to be a structure pointer and the second pointer is not defined to be a structure pointer, and if so, indicating a violation if no char exception applies.

3. The method of claim 2, wherein indicating the type-casting violation involves:
- generating a warning to warn a programmer of a potential type violation if the second pointer is a void or char pointer; and
- generating an error to indicate a type casting violation to the programmer if the second pointer is a pointer to a scalar.

4. The method of claim 1, wherein if the first pointer is defined to point to a first structure type and the second pointer is defined to point to a second structure type, the method further comprises:
- determining whether the first structure type and the second structure type belong to the same alias group; and
- if the first structure type and the second structure type do not belong to the same alias group, generating an error to indicate a type violation.

5. The method of claim 4, wherein determining whether the first structure type and the second structure type belong to the same alias group involves:
- keeping track of special program statements that link structure types into alias groups;
- determining that the first structure type and the second structure type belong to the same alias group if the first structure type and the second structure type are the same structure type, or if one or more special procedures link the first structure type and the second structure type into the same alias group.

6. The method of claim 5, further comprising determining that the first structure type and the second structure type belong to the same alias group if the first structure type and the second structure type have all the same basic types in the same order.

7. The method of claim 1, further comprising:
- receiving an identifier for a set of constraints on memory references that a programmer has adhered to in writing the computer program; and
- using the identifier to select a type casting rule from a set of type casting rules, the selected type casting rule being associated with the set of constraints;
- wherein each type casting rule in the set of type casting rules is associated with a different set of constraints on memory references.

8. The method of claim 1, wherein the method is performed by a compiler.

9. The method of claim 1, wherein the method is performed by an error checking application, which is not part of a compiler.

10. A computer-readable storage medium storing instructions that when executed by a computer cause the computer to perform a method for detecting violations of type casting rules in a computer program, the method comprising:
- receiving the computer program prior to compilation and execution, wherein the computer program is received in source code form;
- locating an explicit type casting operation within the computer program, wherein the explicit type casting operation involves a first pointer and a second pointer;
- checking the explicit type casting operation for a violation of a type casting rule; and
- if a violation is detected, indicating the type-casting violation.

11. The computer-readable storage medium of claim 10, wherein checking the explicit type casting operation involves determining if the first pointer is defined to be a structure pointer and the second pointer is not defined to be a structure pointer, and if so, indicating a violation if no char exception applies.

12. The computer-readable storage medium of claim 11, wherein indicating the type-casting violation involves:
- generating a warning to warn a programmer of a potential type violation if the second pointer is a void or char pointer; and
- generating an error to indicate a type casting violation to the programmer if the second pointer is a pointer to a scalar.

13. The computer-readable storage medium of claim 10, wherein if the first pointer is defined to point to a first structure type and the second pointer is defined to point to a second structure type, the method further comprises:
- determining whether the first structure type and the second structure type belong to the same alias group; and
- if the first structure type and the second structure type do not belong to the same alias group, generating an error to indicate a type violation.

14. The computer-readable storage medium of claim 13, wherein determining whether the first structure type and the second structure type belong to the same alias group involves:
- keeping track of special program statements that link structure types into alias groups;
- determining that the first structure type and the second structure type belong to the same alias group if the first structure type and the second structure type are the same structure type, or if one or more special procedures link the first structure type and the second structure type into the same alias group.

15. The computer-readable storage medium of claim 14, wherein the method further comprises determining that the first structure type and the second structure type belong to the same alias group if the first structure type and the second structure type have all the same basic types in the same order.

16. The computer-readable storage medium of claim 10, wherein the method further comprises:
- receiving an identifier for a set of constraints on memory references that a programmer has adhered to in writing the computer program; and
- using the identifier to select a type casting rule from a set of type casting rules, the selected type casting rule being associated with the set of constraints;
- wherein each type casting rule in the set of type casting rules is associated with a different set of constraints on memory references.

17. The computer-readable storage medium of claim 10, wherein the method is performed by a compiler.

18. The computer-readable storage medium of claim 10, wherein the method is performed by an error checking application, which is not part of a compiler.

19. An apparatus that detects violations of type casting rules in a computer program, comprising:
- a receiving mechanism that is configured to receive the computer program prior to compilation and execution;
- wherein the receiving mechanism is configured to receive the computer program in source code form;
- a locating mechanism that is configured to locate an explicit type casting operation within the computer program, wherein the explicit type casting operation involves a first pointer and a second pointer; and a type rule checking mechanism that is configured check the explicit type casting operation for a violation of a type casting rule, and if a violation is detected, to indicate the type-casting violation.

20. The apparatus of claim 19, wherein the type rule checking mechanism is configured to determine if the first pointer is defined to be a structure pointer and the second pointer is not defined to be a structure pointer, and if so, to indicate a violation if no char exception applies.

21. The apparatus of claim 20, wherein the type casting rule checking mechanism is configured to:
generate a warning to warn a programmer of a potential type violation if the second pointer is a void or char pointer; and to
generate an error to indicate a type-casting violation to the programmer if the second pointer is a pointer to a scalar.

22. The apparatus of claim 19, wherein if the first pointer is defined to point to a first structure type and the second pointer is defined to point to a second structure type, the type rule checking mechanism is configured to:
determine whether the first structure type and the second structure type belong to the same alias group; and to
generate an error to indicate a type violation if the first structure type and the second structure type do not belong to the same alias group.

23. The apparatus of claim 22, wherein in determining whether the first structure type and the second structure type belong to the same alias group, the type rule checking mechanism is configured:
keep track of special program statements that link structure types into alias groups; and to
determine that the first structure type and the second structure type belong to the same alias group if the first structure type and the second structure type are the same structure type, or if one or more special procedures link the first structure type and the second structure type into the same alias group.

24. The apparatus of claim 23, wherein the type rule checking mechanism is configured to determine that the first structure type and the second structure type belong to the same alias group if the first structure type and the second structure type have all the same basic types in the same order.

25. The apparatus of claim 19, wherein the receiving mechanism is configured to receive an identifier for a set of constraints on memory references that a programmer has adhered to in writing the computer program, and further comprising:
a selection mechanism that is configured to use the identifier to select a type casting rule from a set of type casting rules, the selected type casting rule being associated with the set of constraints;
wherein each type casting rule in the set of type casting rules is associated with a different set of constraints on memory references.

26. The apparatus of claim 19, further comprising a compiler that contains the receiving mechanism, the locating mechanism and the type rule checking mechanism.

27. The apparatus of claim 19, further comprising an error checking application, which is not part of a compiler;
wherein the error checking application contains the receiving mechanism, the locating mechanism and the type rule checking mechanism.

* * * * *